(12) United States Patent
Johnson

(10) Patent No.: US 7,705,560 B2
(45) Date of Patent: Apr. 27, 2010

(54) VOLTAGE CONTROLLER

(75) Inventor: Neldon P. Johnson, Salem, UT (US)

(73) Assignee: N. P. Johnson Family Limited Partnership, Salem, UT (US)

( * ) Notice: Subject to any disclaimer, the term of this patent is extended or adjusted under 35 U.S.C. 154(b) by 280 days.

(21) Appl. No.: 11/504,481

(22) Filed: Aug. 15, 2006

(65) Prior Publication Data

US 2008/0054327 A1    Mar. 6, 2008

(51) Int. Cl.
    *H02J 7/00*    (2006.01)
(52) U.S. Cl. .................. 320/117; 320/118; 320/119; 307/110
(58) Field of Classification Search ......... 320/117–127; 307/110
    See application file for complete search history.

(56) References Cited

U.S. PATENT DOCUMENTS

| | | | | |
|---|---|---|---|---|
| 3,886,426 A * | 5/1975 | Daggett | ....................... | 320/117 |
| 4,056,764 A * | 11/1977 | Endo et al. | .................. | 320/101 |
| 5,491,623 A * | 2/1996 | Jansen | ......................... | 363/60 |
| 5,514,916 A * | 5/1996 | Yang | ............................ | 307/81 |
| 5,532,916 A * | 7/1996 | Tamagawa | .................... | 363/62 |
| 5,734,205 A * | 3/1998 | Okamura et al. | ............ | 307/110 |
| 6,307,355 B1 | 10/2001 | Nguyen | ....................... | 323/271 |
| 6,362,609 B1 | 3/2002 | Gailhard | ..................... | 323/280 |
| 6,366,070 B1 | 4/2002 | Cooke | ......................... | 323/284 |
| 6,373,231 B1 | 4/2002 | Lacey | .......................... | 323/268 |
| 6,552,517 B1 | 4/2003 | Ribellino | .................... | 323/282 |
| 6,636,023 B1 | 10/2003 | Amin | .......................... | 323/268 |
| 6,677,737 B2 | 1/2004 | Hamon | ....................... | 323/280 |
| 6,770,984 B2 | 8/2004 | Pai | .............................. | 307/46 |
| 6,784,638 B2 * | 8/2004 | Yang | .......................... | 320/119 |
| 6,975,094 B1 * | 12/2005 | Lascaud et al. | ............. | 320/122 |
| 2005/0093514 A1 * | 5/2005 | Shimizu | ...................... | 320/116 |

\* cited by examiner

*Primary Examiner*—Edward Tso
*Assistant Examiner*—Samuel Berhanu
(74) *Attorney, Agent, or Firm*—J. David Nelson

(57) ABSTRACT

A voltage controller having an input distribution network with imbedded input switches, a number of charge storage elements such as capacitors, an output distribution network with imbedded output switches, and a switch actuator which controls the input switches and output switches to provide for the controlled charging and discharging of the charge storage elements.

10 Claims, 1 Drawing Sheet

VOLTAGE CONTROLLER

FIELD OF THE INVENTION

This invention is in the field of voltage regulator devices and in particular is in the field of direct current ("DC") voltage control devices which provide for a step up or step down in voltage.

BACKGROUND OF THE INVENTION

Devices for the step up or step down in voltage for an input DC voltage are well known and numerous. Such devices have been in use for many years for a variety of applications.

SUMMARY OF THE INVENTION

The voltage controller of the present invention has an input voltage interface for receiving DC power from an input voltage source. An input distribution network connects the input voltage interface to a plurality of charge storage elements. The charge storage elements can be capacitors, batteries or other charge storage devices. An output distribution network connects the charge storage elements to an output voltage interface.

Input switches embedded in the input distribution network provide for each charge storage element to be selectively operated in one of four input operating configurations, input individual configuration with connection of the charge storage element alone to the input voltage interface, input parallel configuration with connection of the charge storage element to the input voltage interface in parallel with one or more other charge storage elements, input series configuration with connection of the charge storage element to the input voltage interface in series with one or more other charge storage elements, or input disconnected configuration with disconnection of the charge storage element from the input voltage interface.

Output switches imbedded in the output distribution network provide for each charge storage element to be selectively operated in one of four output operating configurations, output individual configuration with connection of the charge storage element alone to the output voltage interface, output parallel configuration with connection of the charge storage element to the output voltage interface in parallel with one or more other charge storage elements, output series configuration with connection of the charge storage element to the input voltage interface in series with one or more other charge storage elements, or output disconnected configuration with disconnection of the charge storage element from the output voltage interface.

Polarity switches can be used to reverse the polarity of the output voltage. By controlling the alternating engagement and disengagement of selected first output switches and corresponding second output switches, and the coordinated alternating disengagement and engagement of corresponding first polarity switches and corresponding second polarity switches, the output voltage can be transformed from DC output to alternating current ("AC") output.

The trans-capacitor voltage across each capacitor is monitored continuously by respective storage voltage sensors, each of which transmit a storage voltage signal. The voltage data stream comprised of the storage voltage signals from each storage voltage sensor is transmitted to the switch actuator. The switch actuator allows the user to designate the input voltage if it is known and stable or the input voltage can be continuously monitored by an input voltage sensor which transmits an input voltage signal to the switch actuator. The output voltage is continuously monitored by an output voltage sensor which transmits an output voltage signal to the switch actuator.

The user selects the output voltage desired from the voltage controller and the switch actuator automatically engages and disengages the appropriate switches to generate the desired output voltage. If a step down in voltage is desired, an appropriate number of capacitors may be charged in series and discharged in parallel, either contemporaneously, individually or in groups. If a step up in voltage is desired, an appropriate number of capacitors may be charged in parallel and discharged in series, again either contemporaneously, individually or in groups. Depending on the output current demand, step down voltage applications may provide for more or less continuous output from the voltage controller at the desired voltage. For step up voltage applications, and for high current step down voltage applications, multiple voltage controllers may be used. The capacitor voltages and the output voltage for each controller are then monitored and the input and output of the respective voltage controllers are switched on and off as required to provide an output voltage that remains within a desired tolerance of the selected output voltage.

Based upon current technology, a preferred embodiment of the switch actuator will be a digital computer with appropriate receiving and transmitting devices to allow it to receive signals from sensors deployed for the voltage controller and to transmit control signals to the various switches. For most applications, the switch actuator will also have a control panel to provide for manual selections from the operator. The type of application and the application parameters will ordinarily determine the type of control panel that is desirable. Preferred embodiments of the switch actuator will also have a stored control algorithm program which continuously determines the required switch configuration.

DETAILED DESCRIPTION

Figure 1:
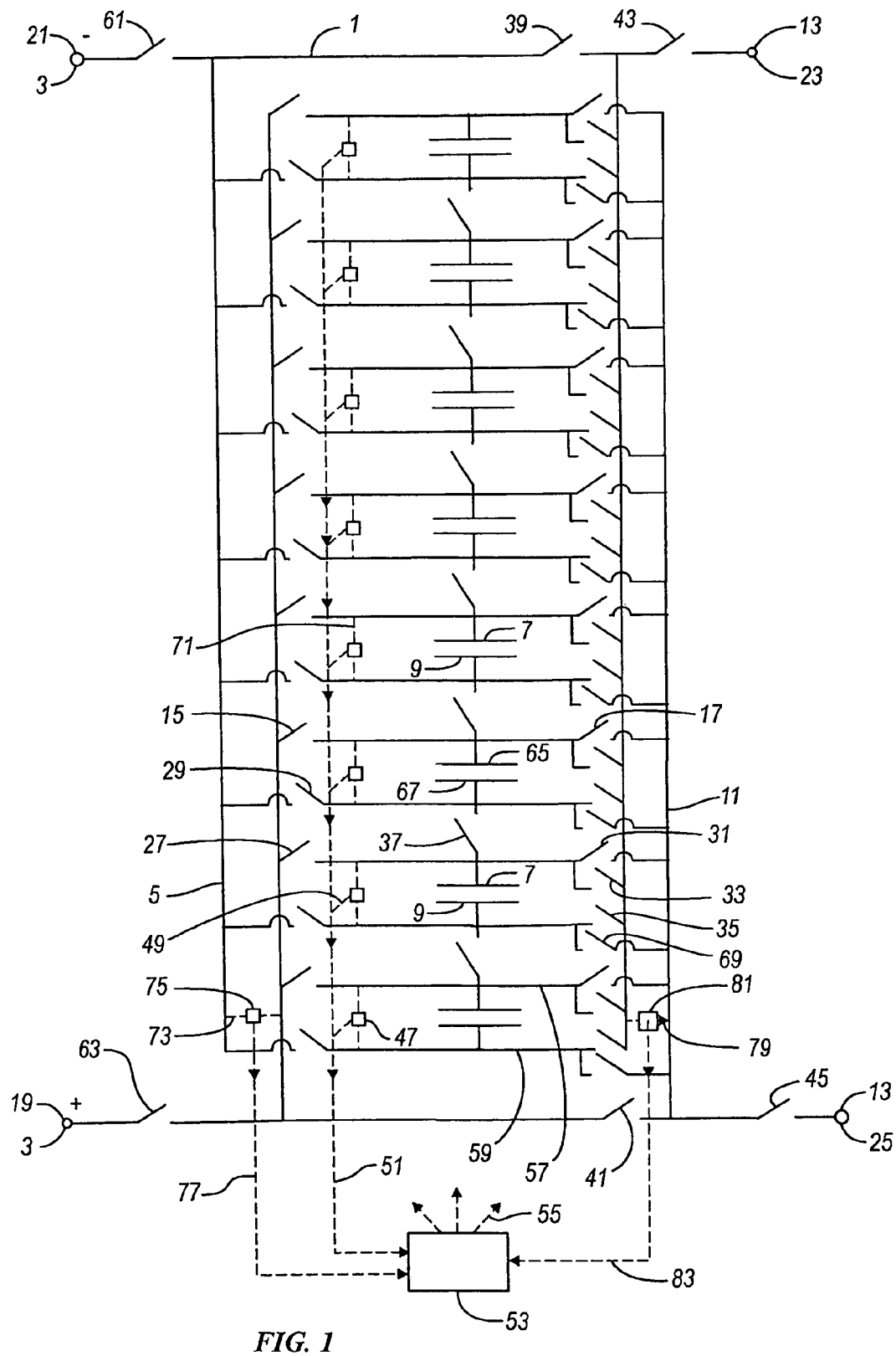
FIG. 1 is a schematic diagram of a preferred embodiment of the voltage controller of the present invention.

Referring to FIG. 1, a schematic of a preferred embodiment of the voltage controller 1 of the present invention is shown. An input voltage interface 3 provides for receiving DC power from an input voltage source. An input distribution network 5 connects the input voltage interface to a plurality of charge storage elements 7. For the embodiment shown, the charge storage elements are capacitors 9, which are preferred by the inventor. Other charge storage devices such as batteries can be used for charge storage elements for other embodiments. Future technological developments also will undoubtedly result in the development of other charge storage devices which can be used for charge storage elements for other embodiments. An output distribution network 11 connects the charge storage elements to an output voltage interface 13.

Input switches 15 embedded in the input distribution network provide for each charge storage element to be selectively operated in one of four input operating configurations, input individual configuration with connection of the charge storage element alone to the input voltage interface, input parallel configuration with connection of the charge storage element to the input voltage interface in parallel with one or more other charge storage elements, input series configuration with connection of the charge storage element to the input voltage interface in series with one or more other charge storage elements, or input disconnected configuration with disconnection of the charge storage element from the input voltage interface.

Likewise output switches 17 imbedded in the output distribution network provide for each charge storage element to be selectively operated in one of four output operating configurations, output individual configuration with connection of the charge storage element alone to the output voltage interface, output parallel configuration with connection of the charge storage element to the output voltage interface in parallel with one or more other charge storage elements, output series configuration with connection of the charge storage element to the input voltage interface in series with one or more other charge storage elements, or output disconnected configuration with disconnection of the charge storage element from the output voltage interface.

The input voltage interface has a positive input terminal 19 and a negative input terminal 21. The output voltage interface has a first output terminal 23 and a second output terminal 25. A pair of input isolation switches 61, 63 provide for the interruption of the input voltage as desired for the operation of the voltage controller 1. Likewise a pair of output isolation switches 43, 45 provide for the interruption of the output. A pair of bypass switches 39, 41 may provide for bypassing the input voltage to the output voltage interface 13.

The input switches 15 include first input switches 27 and second input switches 29 which, for the embodiment shown, can be used selectively to direct positive voltage and negative voltage respectively to the capacitors 9 through first capacitor supply lines 57 and second capacitor supply lines 59.

The preferred embodiment shown in FIG. 1 also includes capacitor series switches 37 which can be used selectively as input switches and part of the input distribution network or selectively as output switches and part of the output distribution network. As input switches, the capacitor series switches can be used selectively to provide for the input voltage to be directed to two or more selected capacitors in series. Similarly as output switches, the capacitor series switches can be used selectively with the output switches to provide for two or more selected capacitors to be connected in series to the output voltage interface.

The output switches 17 for the respective capacitors include first output switches 31 and second output switches 35 can be used selectively to connect the positive capacitor element 65 and the negative capacitor element 67 respectively to the output distribution network 11. Polarity switches comprising first polarity switches 33 and second polarity switches 69 can be used to reverse the polarity of the output voltage. By controlling the alternating engagement and disengagement of selected first output switches and the corresponding second output switches, and the coordinated alternating disengagement and engagement of corresponding first polarity switches and corresponding second polarity switches, the output voltage can be transformed from DC output to alternating current ("AC") output. Therefore, not only does the voltage controller provide for the regulation of the magnitude of the output voltage, it can also eliminate the need for an inverter to produce AC at a desired voltage.

The trans-capacitor voltage 71 across each capacitor 7 is monitored continuously by respective storage voltage sensors 47, each of which transmit a storage voltage signal 49. The voltage data stream 51 comprised of the storage voltage signals from each storage voltage sensor is transmitted to the switch actuator 53. The switch actuator allows the user to designate the input voltage if it is known and stable or the input voltage 73 can be continuously monitored by an input voltage sensor 75 which transmits an input voltage signal 77 to the switch actuator. The output voltage 79 is continuously monitored by an output voltage sensor 81 which transmits an output voltage signal 83 to the switch actuator.

The user selects the output voltage desired from the voltage controller and the switch actuator automatically engages and disengages the appropriate switches to generate the desired output voltage. If a step down in voltage is desired, an appropriate number of capacitors may be charged in series and discharged in parallel, either contemporaneously, individually or in groups. If a step up in voltage is desired, an appropriate number of capacitors may be charged in parallel and discharged in series, again either contemporaneously, individually or in groups. Depending on the output current demand, step down voltage applications may provide for more or less continuous output from the voltage controller at the desired voltage. For step up voltage applications, and for high current step down voltage applications, multiple voltage controllers may be used. The capacitor voltages and the output voltage for each controller are then monitored and the input and output of the respective voltage controllers are switched on and off as required to provide an output voltage that remains within a desired tolerance of the selected output voltage.

The embodiment of the voltage controller shown in FIG. 1 has eight capacitors. However, the number of capacitors or other charge storage elements can be varied as desired. This would also require a commensurate change in the number of input switches and the number of output switches.

A number of switching devices than can be used for the input switches, output switches, capacitor series switches, polarity switches, and other switches incorporated in embodiments of the present invention will be known to persons skilled in the art. Further advances in technology will also result in the development of further switching devices that can be utilized for the present invention. The switching devices utilized will need to compatible with the switch actuator and the minimum response time for the switches will vary depending upon the application. The switching devices used for the first output switches, the second output switches, the first polarity switches, and the second polarity switches will have to provide for a response time that is compatible with the desired frequency of the AC output for embodiments which provide for an AC output. For such embodiments, certain switching devices will also provide for a better fit on the desired waveform of the AC output. Switching devices that provide for ramping up and ramping down in a desired waveform, rather than an abrupt on or off, may be desirable for AC output applications. Alternatively, a separate device may be deployed to transform a square wave AC output voltage to a sinusoidal wave or other desired waveform.

Based upon current technology, a preferred embodiment of the switch actuator will be a digital computer with appropriate receiving and transmitting devices to allow it to receive signals from sensors deployed for the voltage controller and to transmit control signals 55 to the various switches. For most applications, the switch actuator will also have a control panel to provide for manual selections from the operator, such as on or off, the desired output voltage, the desired voltage tolerance, and the type of output, i.e. DC or AC. The type of application and the application parameters will ordinarily determine the type of control panel that is desirable. Preferred embodiments of the switch actuator will also have a stored control algorithm program which continuously determines the required switch configuration, i.e. which switches need to be on and which need to be off, at any given time, based upon the input voltage, the sensor signals, and the desired output voltage, as well as other factors that are inherent to the application or are selected by the operator. The switch actuator can be local or remote and can communicate with the voltage controller components by wire or wireless communication. A switch actuator can also be used to control more than one voltage controller. The switch actuator also can be a computer network or personal computer with the control algorithm program stored and operating thereon, the network or personal computer having appropriate receiving and transmitting devices to receive sensor signals and transmit switch control signals. The switch actuator can also consist of a switch drive and a separate control computer, the switch drive sending signals to the switches, opening and closing the switches as directed by the control computer. Other embodiments and configurations of the switch actuator will be known to persons skilled in the art. Further advances in technology will also provide and make feasible additional embodiments of the switch actuator.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. A voltage controller providing for automated step up or step down of a variable input voltage of an input DC power source to a desired output voltage with a desired output voltage tolerance, the voltage controller comprising:
    a) input voltage interface for receiving DC power from the input source at the input voltage;
    b) input voltage sensor;
    c) plurality of variable voltage, transient charge storage elements;
    d) input distribution network;
    e) plurality of input switches embedded in the input distribution network providing for each charge storage element to be selectively operated in one of four input operating configurations, input individual configuration with connection of the charge storage element alone to the input voltage interface, input parallel configuration with connection of the charge storage element to the input voltage interface in parallel with one or more other charge storage elements, input series configuration with connection of the charge storage element to the input voltage interface in series with one or more other charges storage elements, or input disconnected configuration with disconnection of the charge storage element from the input voltage interface;
    f) output voltage interface;
    g) output distribution network;
    h) plurality of output switches imbedded in the output distribution network providing for each charge storage element to be selectively operated in on of four output operating configurations, output individual configuration with connection of the charge storage element alone to the output voltage interface, output parallel configuration with connection of the charge storage element to the output voltage interface in parallel with one or more other charge storage elements, output series configuration with connection of the charge storage element to the input voltage interface in series with one or more other charge storage elements, or output disconnected configuration with disconnection of the charge storage element from the output voltage interface; and
    i) automated switch actuator communicating with the input voltage sensor and communicating with and controlling the input switches and the output switches and providing for producing the desired output voltage with the desired output voltage tolerance for an output time, based upon the input voltage as measured by the input voltage sensor, the automated switch actuator comprising a digital computer with a stored control algorithm program.

2. Voltage controller as recited in claim 1 further comprising an output voltage sensor in communication with the switch actuator.

3. Voltage controller as recited in claim 1 further comprising a plurality of storage voltage sensors, one or more storage voltage sensors being installed for each charge storage element.

4. Voltage controller as recited in claim 1 wherein one or more of the charge storage elements is a capacitor.

5. Voltage controller as recited in claim 1 wherein the output switches further comprise a plurality of first polarity switches and a plurality of second polarity switches providing for reversal of polarity of the output voltage.

6. Voltage controller as recited in claim 5 wherein the output switches further comprise a plurality of first output switches and a plurality of second output switches and the switch actuator further provides for the alternating engagement and disengagement of one or more selected first output switches and the corresponding second output switches, and the coordinated alternating disengagement and engagement of corresponding first polarity switches and corresponding second polarity switches, providing for the output voltage to be transformed from DC output to AC output.

7. A voltage controller providing for automated step up or step down of a variable input DC power source to a desired output voltage with a desired output voltage tolerance, the voltage controller comprising:
    a) input voltage interface for receiving DC power from an input source at the input voltage;
    b) input voltage sensor;
    c) plurality of variable voltage, transient charge storage elements;
    d) input distribution network connecting the input voltage interface to each charge storage element;
    e) plurality of input switches embedded in the input distribution network providing for each charge storage element to be selectively operated in one of four input operating configurations, input individual configuration with connection of the charge storage element alone to the input voltage interface, input parallel configuration with connection of the charge storage element to the input voltage interface in parallel with one or more other charge storage elements, input series configuration with connection of the charge storage element to the input voltage interface in series with one or more other charge storage elements, or input disconnected configuration with disconnection of the charge storage element from the input voltage interface;
    f) output voltage interface;
    g) output distribution network connecting each of the charge storage elements to the output voltage interface;
    h) plurality of output switches imbedded in the output distribution network providing for each charge storage element to be selectively operated in one of four output operating configurations, output individual configuration with connection of the charge storage element alone to the output voltage interface, output parallel configuration with connection of the charge storage element to the output voltage interface in parallel with one or more other charge storage elements, output series configuration with connection of the charge storage element to the input voltage interface in series with one or more other charge storage elements, or output disconnected configuration with disconnection of the charge storage element from the output voltage interface, the output switches further comprising a plurality of first polarity switches and a plurality of second polarity switches providing for reversal of polarity of the output voltage, and the output switches further comprising a plurality of first output switches and a plurality of second output switches; and i) automated switch actuator communicating with and controlling the input switches and the output switches and providing for producing the desired output voltage with the desired output voltage tolerance for an output time, based upon the input voltage as measured by the input voltage sensor, the automated switch actuator comprising a digital computer with a stored control algorithm program, and the switch actuator further providing for the alternating engagement and disengagement of one or more selected first output switches and the corresponding second output switches, and the coordinated alternating disengagement and engagement of corresponding first polarity switches and corresponding second polarity switches, providing for the output voltage to be transformed from DC output to AC output.

8. Voltage controller as recited in claim 7 further comprising an output voltage sensor in communication with the switch actuator.

9. Voltage controller as recited in claim 7 further comprising a plurality of storage voltage sensors, one or more storage voltage sensors being installed for each charge storage element.

10. Voltage controller as recited in claim 7 wherein one or more of the charge storage elements is a capacitor.

* * * * *